US012561310B2

(12) United States Patent
Li et al.

(10) Patent No.: US 12,561,310 B2
(45) Date of Patent: Feb. 24, 2026

(54) METADATA REFRESHMENT FOR A WEB SERVICE

(71) Applicant: SAP SE, Walldorf (DE)

(72) Inventors: Hui Li, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/389,476

(22) Filed: Nov. 14, 2023

(65) Prior Publication Data

US 2025/0156395 A1     May 15, 2025

(51) Int. Cl.
*G06F 16/23* (2019.01)

(52) U.S. Cl.
CPC ................................. *G06F 16/2365* (2019.01)

(58) Field of Classification Search
CPC .................................................. G06F 16/2365
See application file for complete search history.

(56) References Cited

U.S. PATENT DOCUMENTS

| | | | | |
|---|---|---|---|---|
| 2008/0034071 | A1* | 2/2008 | Wilkinson | ............... H04L 67/51 707/999.01 |
| 2014/0317617 | A1* | 10/2014 | O'Donnell | ............ G06F 9/5027 718/1 |

| | | | | |
|---|---|---|---|---|
| 2015/0370232 | A1* | 12/2015 | Kohn | ........................ G06N 5/04 700/287 |
| 2020/0065342 | A1* | 2/2020 | Panuganty | ............... G06F 16/26 |
| 2021/0264377 | A1* | 8/2021 | Ebner | ................ G06Q 10/1093 |
| 2022/0293107 | A1* | 9/2022 | Leaman | ................. G10L 15/26 |
| 2022/0309387 | A1* | 9/2022 | Rodriguez | ............ H04L 9/3213 |
| 2023/0012642 | A1* | 1/2023 | Deng | .................... G06F 16/235 |
| 2023/0144396 | A1* | 5/2023 | Burnett | ............... G06F 11/0757 707/703 |
| 2024/0412135 | A1* | 12/2024 | Stavarache | ...... G06Q 10/06316 |

* cited by examiner

*Primary Examiner* — Courtney Harmon

(74) *Attorney, Agent, or Firm* — Sterne, Kessler, Goldstein & Fox P.L.L.C.

(57) ABSTRACT

Disclosed herein are system, method, and computer program product embodiments for updating metadata associated with a data model. The data model comprises entities arranged into a plurality of entity groups. A determination is made that the data model has been changed based on either a first or second trigger event. If the determination is based on the first trigger event, the entities in the plurality of entity groups are resolved, and for the entities that resolved successfully, updated metadata is generated commensurate with the change and subsequently saved. If the determination is based on the second trigger event, a first entity group of the plurality of entity groups that is associated with the change is determined. All entities in the first entity group are resolved, and for the entities in the first entity group that resolved successfully, updated metadata commensurate with the change may be generated and subsequently saved.

20 Claims, 11 Drawing Sheets

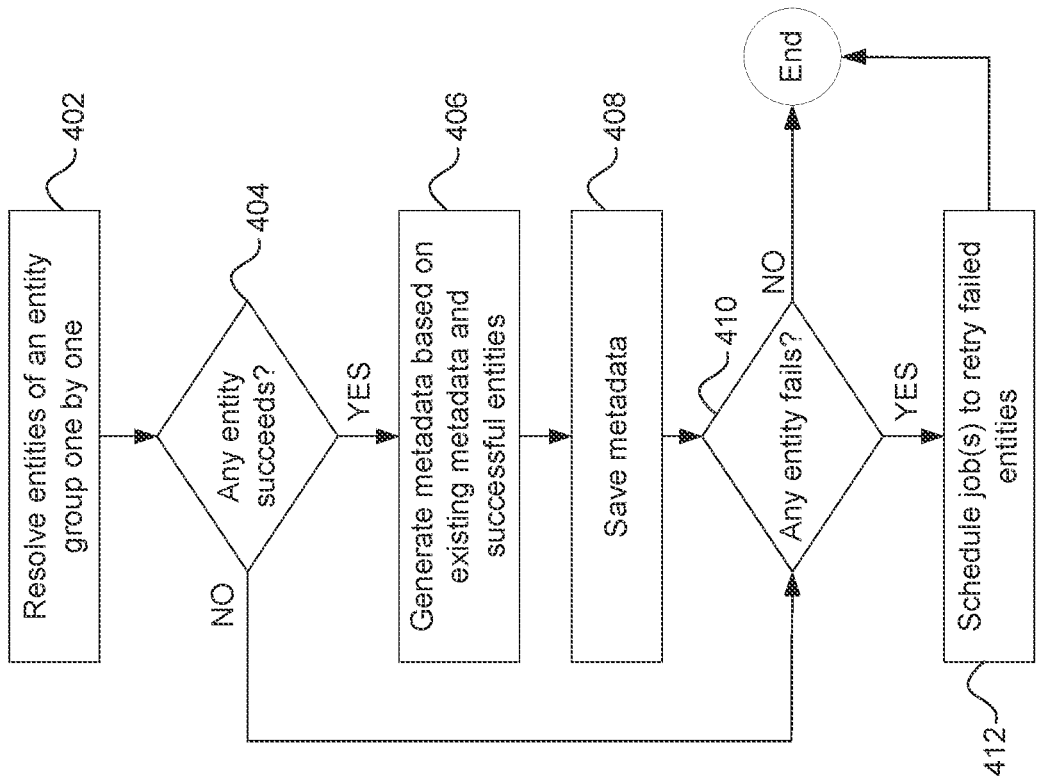
400
Resolve entities of an entity group one by one — 402
Any entity succeeds? — 404
NO
YES
Generate metadata based on existing metadata and successful entities — 406
Save metadata — 408
Any entity fails? — 410
NO
YES
Schedule job(s) to retry failed entities — 412
End
FIG. 4

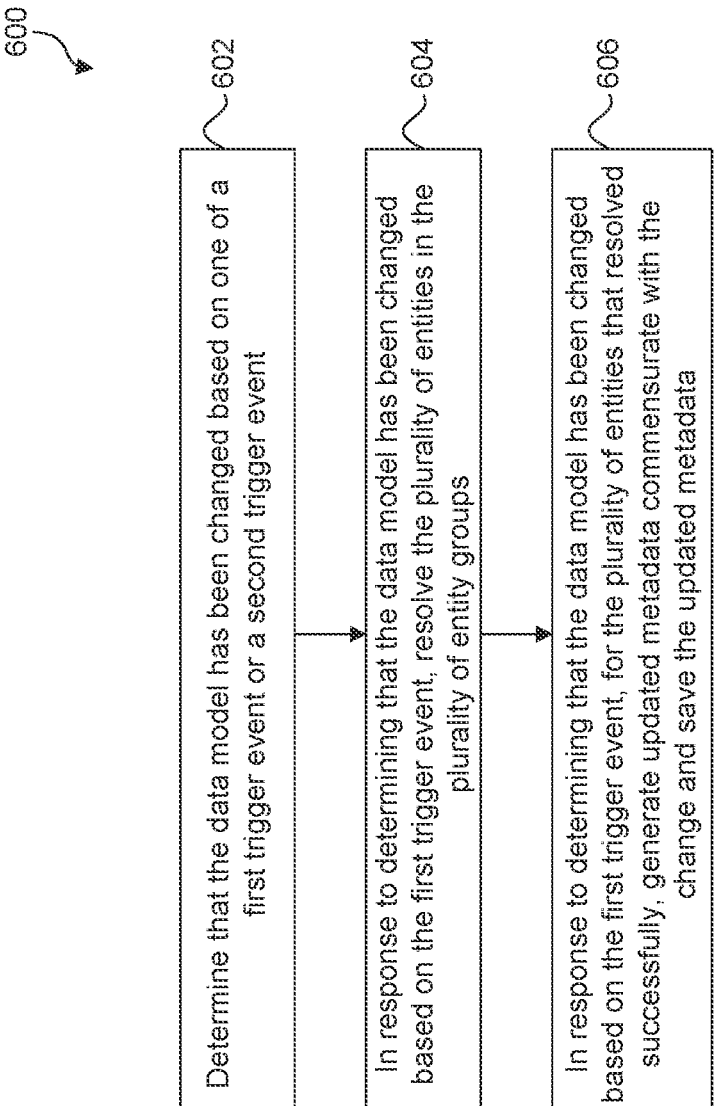

600

Determine that the data model has been changed based on one of a first trigger event or a second trigger event — 602

In response to determining that the data model has been changed based on the first trigger event, resolve the plurality of entities in the plurality of entity groups — 604

In response to determining that the data model has been changed based on the first trigger event, for the plurality of entities that resolved successfully, generate updated metadata commensurate with the change and save the updated metadata — 606

FIG. 6

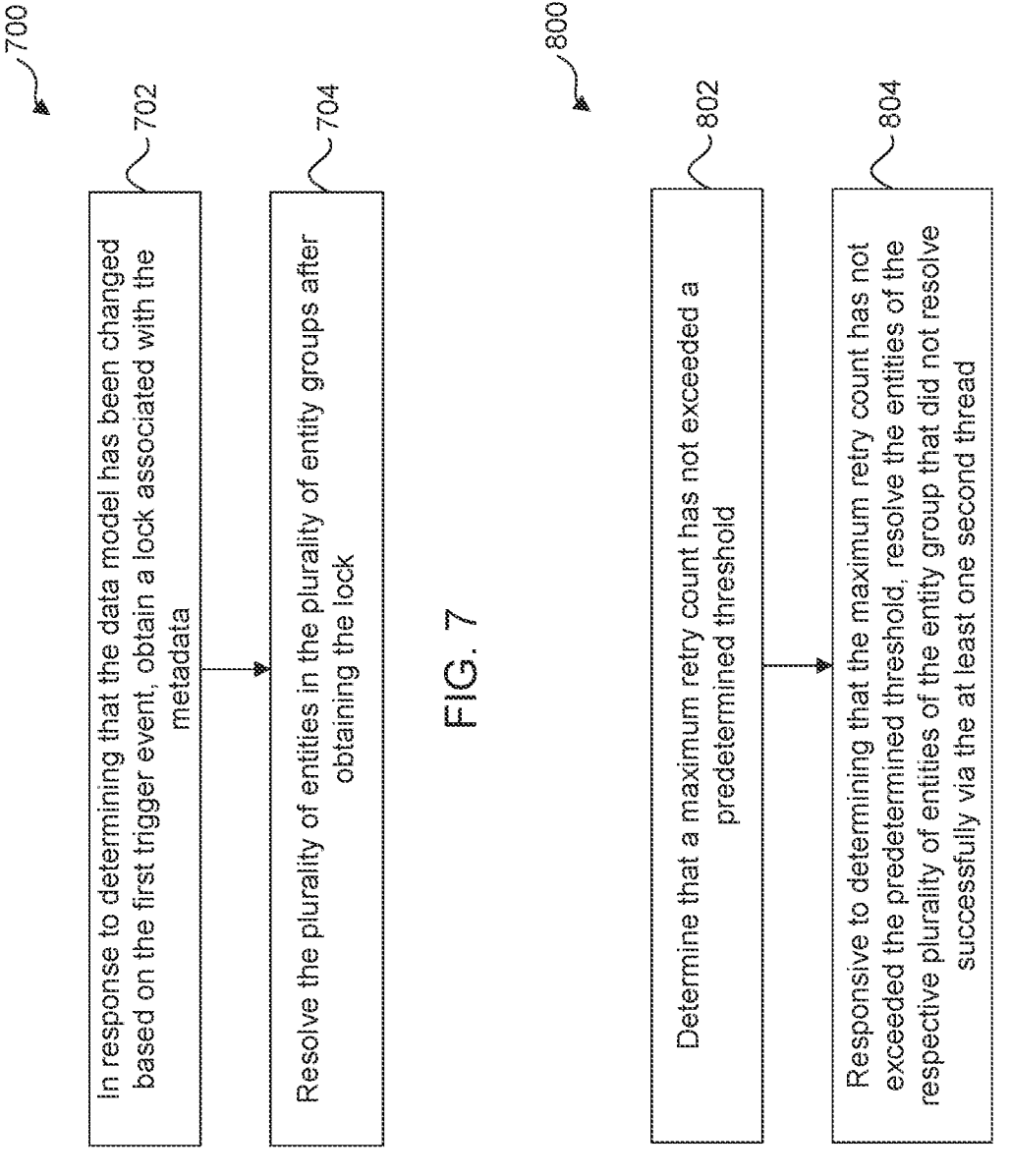

700

702

In response to determining that the data model has been changed based on the first trigger event, obtain a lock associated with the metadata

704

Resolve the plurality of entities in the plurality of entity groups after obtaining the lock

Determine that a maximum retry count has not exceeded a predetermined threshold

804

Responsive to determining that the maximum retry count has not exceeded the predetermined threshold, resolve the entities of the respective plurality of entities of the entity group that did not resolve successfully via the at least one second thread

FIG. 8

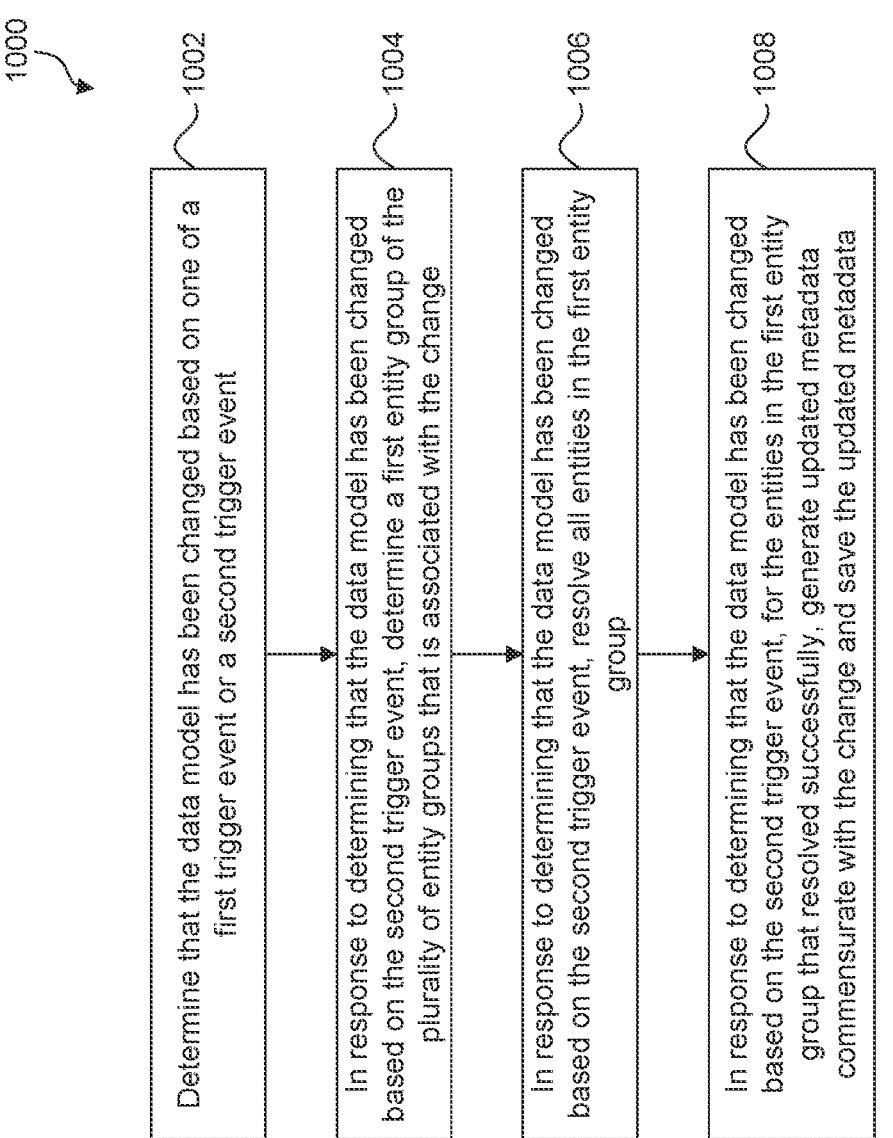

1000

Determine that the data model has been changed based on one of a first trigger event or a second trigger event
1002

In response to determining that the data model has been changed based on the second trigger event, determine a first entity group of the plurality of entity groups that is associated with the change
1004

In response to determining that the data model has been changed based on the second trigger event, resolve all entities in the first entity group
1006

In response to determining that the data model has been changed based on the second trigger event, for the entities in the first entity group that resolved successfully, generate updated metadata commensurate with the change and save the updated metadata
1008

FIG. 10

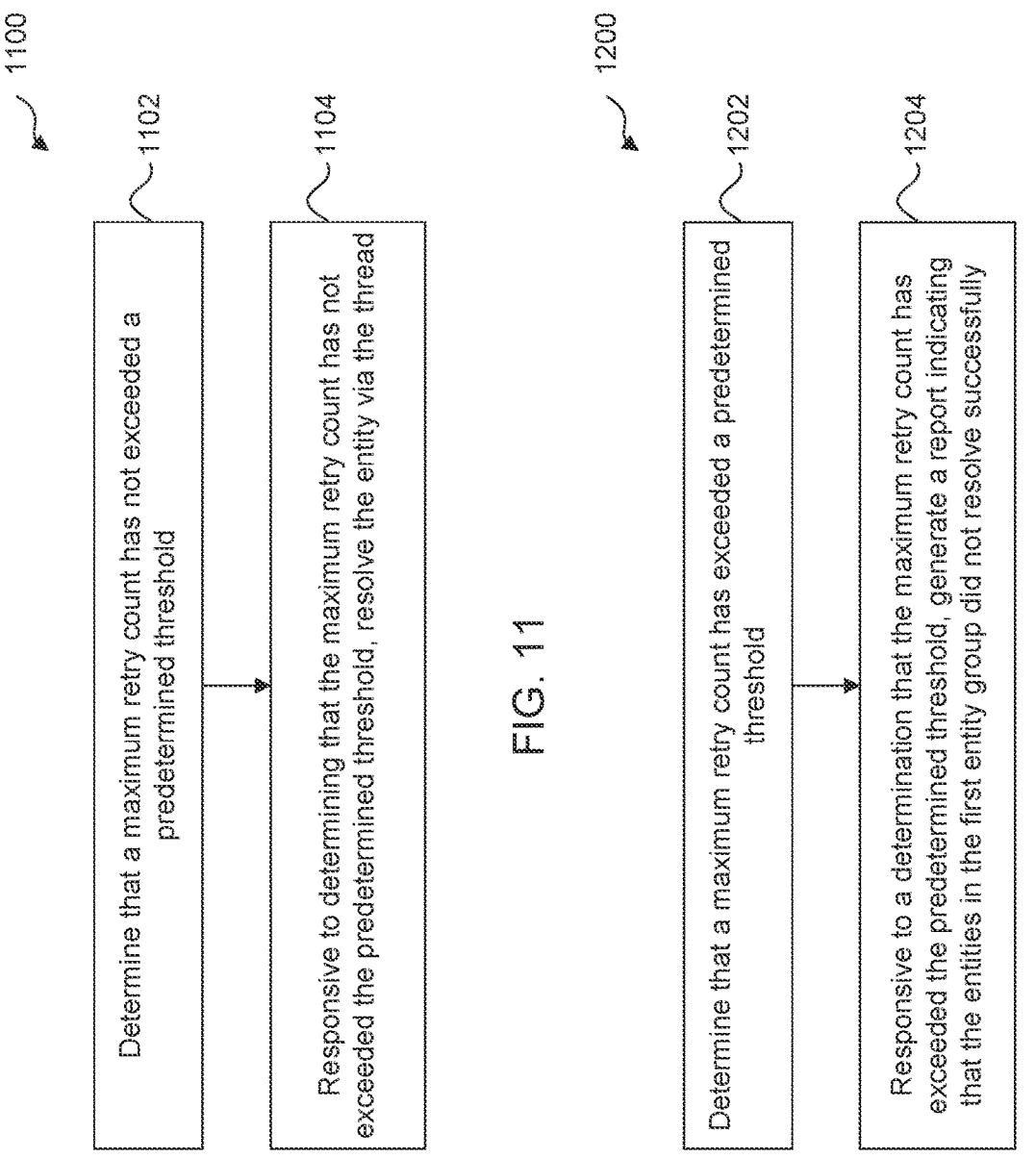

1100

1102 Determine that a maximum retry count has not exceeded a predetermined threshold 1104 Responsive to determining that the maximum retry count has not exceeded the predetermined threshold, resolve the entity via the thread

1202 Determine that a maximum retry count has exceeded a predetermined threshold 1204 Responsive to a determination that the maximum retry count has exceeded the predetermined threshold, generate a report indicating that the entities in the first entity group did not resolve successfully

FIG. 12

METADATA REFRESHMENT FOR A WEB SERVICE

BACKGROUND

Background

Different business components of a cloud-based platform may communicate with each other via a web service, which is a software system configured to perform a specific set of functions. The web service is associated with metadata, which provides the data structure of the components of the data model of the web service to the client and enables a server hosting the web service to process invocation requests for the web service. A user may need to change the data structure or data model of the web service. If a change is needed, and the descriptions provided in the associated metadata are not refreshed, both the server hosting the web service and the client will not be able to perceive the change compatibly, thereby resulting in improper invocation or data requests.

BRIEF DESCRIPTION OF THE DRAWINGS

The accompanying drawings are incorporated herein and form a part of the specification.

FIG. 4 is a flowchart illustrating a process for refreshing metadata of a web service based on a local trigger event of a second event type, according to some embodiments.

FIG. 6 is a flowchart illustrating a process for updating metadata associated with a data model, wherein the data model comprises a plurality of entities arranged into a plurality of entity groups, according to some embodiments.

FIG. 7 is a flowchart illustrating a process for resolving entities based on obtaining a lock on the metadata, according to some embodiments.

FIG. 8 is a flowchart illustrating a process for retrying entity resolution for an entity that resolved unsuccessfully, according to some embodiments.

FIG. 10 is a flowchart illustrating a process for updating metadata associated with a data model, wherein the data model comprises a plurality of entities arranged into a plurality of entity groups, according to some additional embodiments.

FIG. 11 is a flowchart illustrating a process for retrying entity resolution for an entity that resolved unsuccessfully, according to some additional embodiments.

FIG. 12 is a flowchart illustrating a process for reporting an error based an unsuccessful entity resolution for an entity, according to some additional embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
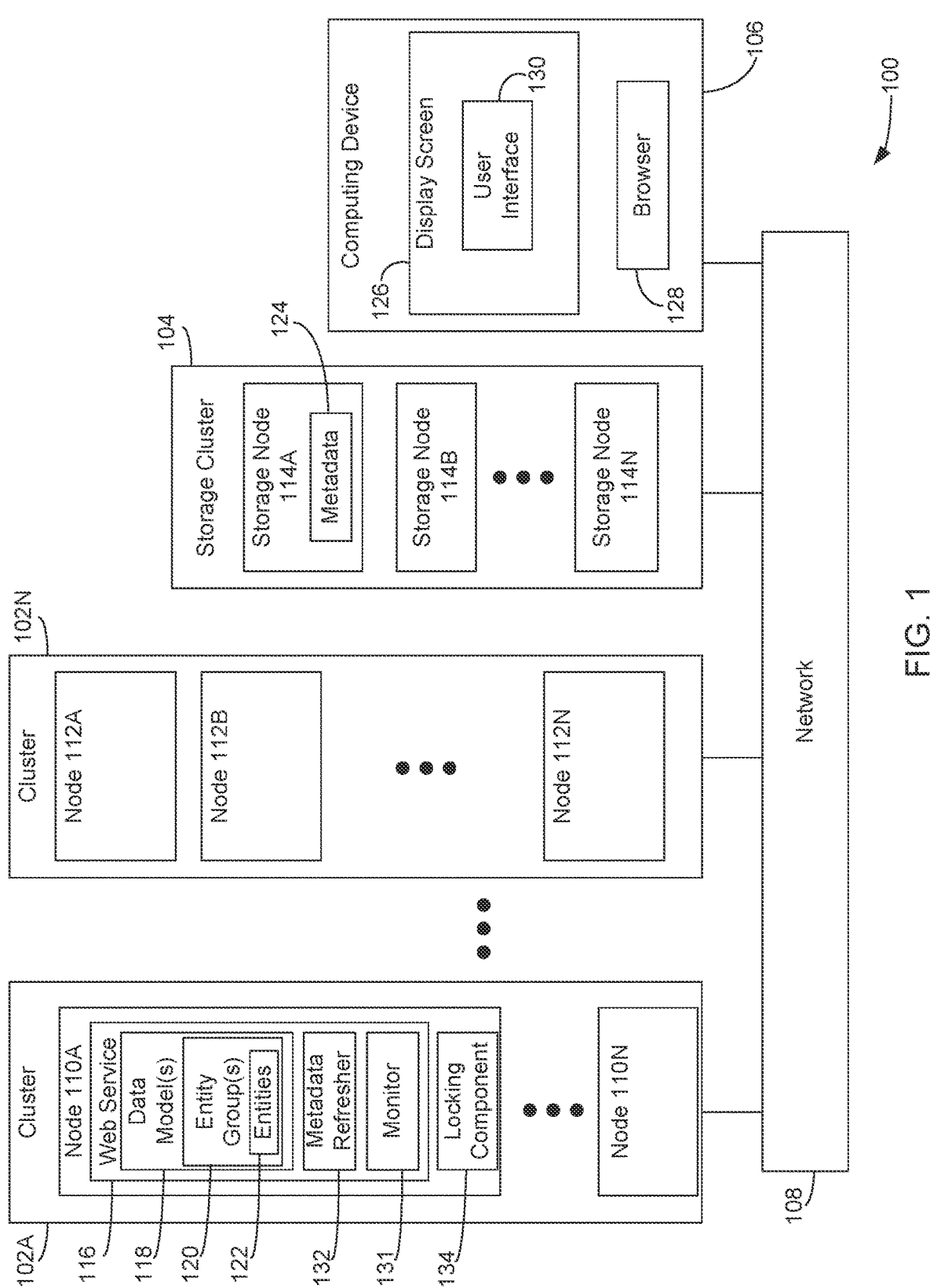
FIG. 1 is a block diagram of a network-based computing system configured to refresh metadata of a web service, according to some embodiments.

Most cloud systems support multiple tenants, and each tenant may use its own respective data model for the web service. Each data model may be associated with a respective set of metadata. Accordingly, different tenants may be associated with a different set of metadata of the web service. Once a tenant changes its data model (or entity definition within the data model), the corresponding metadata of the web service should be refreshed to prevent an error. For example, suppose a tenant adds a new property to an entity type on its client-side. If the metadata on the server-side is not refreshed, both the server hosting the web service and the client will not be able to perceive the change, thereby resulting in an improper invocation or data request. Certain issues may arise when attempting to refresh metadata. For example, if too many refreshments of metadata occur concurrently, the computer resources (e.g., processing cycles, memory, input/output (I/O) operations, etc.) of the computing system(s) hosting the web service are unduly burdened. In another example, certain unexpected errors may occur during the refreshment of metadata (e.g., database errors, network errors, etc.), which results in client requests that are inconsistent with the data models of the web service.

A data model is a set of entities, entity groups and entity types used by an individual tenant to invoke a web service. An entity type within a data model is a collection of properties in a single identifiable data structure. That data structure of an entity type is described by its associated metadata. A property is a data element within an entity type. A definition of an entity type includes all of the properties associated with that entity type. In some cases, a property is unique to a single entity type within a data model while in other cases a property is shared among a plurality of entity types within a data model. An entity type is a generic data structure or class. An example of an entity type could be a User of the tenant data model. When a specific data structure is created for a particular user (e.g., User="John Smith"), an instance for that entity type is created and used within the data model. When a property is shared among more than one entity type, the associated entities to those entity types that share that property form an entity group, such that a change to a single property impacts all the entities in that entity group. It should be noted that one entity type could be associated with multiple entity groups.

Provided herein are system, apparatus, device, method and/or computer program product embodiments, and/or combinations and sub-combinations thereof, for refreshing metadata of a web service. It should be noted that a change to a tenant's data model on the client-side does not necessarily require an update to all of the metadata for all of the entities or entity groups in that data model. Thus, the amount of metadata being updated can be throttled based on different triggering events requiring an update to the data model. For example, the web service may detect a global trigger event for updating all of the metadata associated with a tenant's data model. One example of a global trigger event is a change to a property that spans two or more entity groups. Such a global trigger event causes the server to update the entire data model. An example of another global trigger event is if the metadata hasn't been updated over a specific period of time (e.g., 7 days). If a certain amount of time has elapsed since the last update to the metadata, such a global trigger event will cause the server to update the entire data model.

There are other circumstances where updating the entire data model is not necessary but instead just a single entity's or a single entity group's metadata is updated. In such scenarios, processing the entire data model for updates is unnecessary. This typically occurs where a change is confined to a single entity group. In this way, only a portion of the data model is updated. A detected change to a single entity's or entity groups' metadata is referred to as a local trigger event. It should be noted that a change may be made to one entity in one entity group and a different change may be made to the same or different entity in a different entity group, but these changes are independent of each other and thus two local triggering events occur.

By utilizing different event types to determine how metadata is to be refreshed, the amount of metadata refreshed may be reduced. For instance, when detecting a trigger event of the local trigger event type, a targeted metadata refreshment may be performed based on just the entity or entity group that were updated, thereby preventing metadata refreshment for all the entities within the data model. This advantageously reduces the computer resources (e.g., processing cycles, memory, I/O, etc.) utilized for refreshing metadata. Moreover, when detecting a global trigger event, a lock may be placed on the metadata, which limits the number of global metadata refreshment operations in a period of time and avoids the overuse of computer resources.

In some circumstances, for both global and local triggering events, not every entity type is successfully updated. If this occurs, unsuccessful metadata refresh operations may be retried to prevent inconsistencies between the client and server. Accordingly, the embodiments described herein improve the functioning and stability of the system on which the web service executes, as both computer resource usage and invocation and data request errors are reduced.

FIG. 1 shows a block diagram of an example network-based computing system 100 configured to refresh metadata of a web service, according to some embodiments. As shown in FIG. 1, system 100 includes a plurality of clusters 102A to 102N, a storage cluster 104, and a computing device 106. Each of clusters 102A through 102N, storage cluster 104, and computing device 106 are communicatively coupled to each other via a network 108. Network 108 may comprise one or more networks such as local area networks (LANs), wide area networks (WANs), enterprise networks, the Internet, etc., and may include one or more of wired and/or wireless portions.

Clusters 102A through 102N and/or storage cluster 104 may form a network-accessible server set (e.g., a cloud-based environment or platform). Each of clusters 102A through 102N may comprise a group of one or more nodes (also referred to as computer nodes or computer instances) and/or a group of one or more storage nodes (also referred to as storage instances). For example, as shown in FIG. 1, cluster 102A includes nodes 110A-110N and cluster 102N includes nodes 112A-112N. Each of nodes 110A-110N and/or 112A-112N are accessible via network 108 (e.g., in a "cloud-based" embodiment) to build, deploy, and manage applications and services. Storage cluster 104 comprises one or more storage nodes 114A-114N. Each of storage node(s) 114A-114N comprises a plurality of physical storage media that are accessible via network 108 and is configured to store data associated with the applications and services managed by nodes 110A-110N and/or 112A-112N. In some example implementations, one or more of storage nodes 114A to 114N is virtual storage that is maintained for a single tenant. In such implementations, such storage node(s) of storage nodes 114A to 114N include the data used by one tenant while other node(s) of storage nodes 114A to 114N include the data used by a second tenant, etc.

In an embodiment, one or more of clusters 102A through 102N and/or storage cluster 104 may be co-located (e.g., housed in one or more nearby buildings with associated components such as backup power supplies, redundant data communications, environmental controls, etc.) to form a datacenter, or may be arranged in other manners. Accordingly, in an embodiment, one or more of cluster 102A, cluster 102N and/or storage cluster 104 may be a datacenter in a distributed collection of datacenters.

Each of the node(s) 110A-110N through 112A-112N may comprise one or more server computers, server systems, computing devices, and/or virtual machines. Each of the node(s) 110A-110N and 112A-112N may be configured to execute one or more software applications (or "applications") and/or services and/or manage hardware resources (e.g., processors, memory, etc.), which may be utilized by users (e.g., customers) of the network-accessible server set. Node(s) 110A-110N and 112A-112N and storage node(s) 114A-114N may also be configured for specific uses. For example, as shown in FIG. 1, node 110A may be configured to execute a web service 116 and a locking component 134. It is noted that an instance of web service 116 and locking component 134 may execute on other node(s) (e.g., node 110N and/or node(s) 112A-112N) in lieu of or in addition to node 110A.

In an embodiment, node 110A may be configured to be a multi-tenant machine. In accordance with such an embodiment, node 110A enables a plurality of tenants to utilize web service 116 and locking component 134. A tenant may comprise a group of one or more users (e.g., an organization, a business, etc.) who share common access with specific privileges to web service 116. Node 110A may be configured to be a multi-tenant machine by being configured to execute a multi-tenant virtual machine configured to execute web service 116 and locking component 134.

Web service 116 may comprise a set of related application functions (e.g., Web application functions) that can be programmatically invoked via network 108. Web service 116 may enable different components of system 100 to communicate with each other. Web service 116 may utilize one or more communication message protocols, including, but not limited to, a representational state transfer (REST)-based message protocol or an open data protocol (OData)-based message protocol.

Web service 116 may comprise one or more data models 118, each of which is associated with and utilized by a respective tenant. Each of data model(s) 118 comprise one or more of entity groups 120, each of which comprise one or more entities 122. Each of data model(s) 118 includes a respective set of entities of entity(ies) 122, and therefore, may be referred to as a global data model. Entity(ies) 122 may be instances of entity types, which are named structured types with a key. Entity types define the named properties and relationships of an entity. Entity types may derive by inheritance from other entity types. The key of an entity type may be formed from a subset of primitive properties (e.g., CustomerId, OrderId, LineId, etc.) of the entity type. Each of entity group(s) 120 may comprise entity(ies) 122 that have a close relationship and belong to the domain of the entity group. For example, in an e-commerce system, entity(ies) 122 may be grouped into the following entity groups: production, order, bill, delivery, inventory, customer, supplier, supporter, etc. That is, each of entity group (s) 120 may comprise entity(ies) 122 that belong to its domain. This grouping can be created by entities within an entity group sharing one or more properties. Alternatively, a tenant may create an entity group that fits that tenant's needs.

Web service 116 may be associated with metadata, which provides the data structure of data model(s) 118 to the client and enables node 110A to process invocation requests of web service 116. An example of a metadata fragment is shown below:

may be any type of stationary device, such as a desktop computer or PC (personal computer), or mobile computing device (such as a laptop computer, a notebook computer, a tablet computer, etc.).

As each tenant utilizes a respective data model of data model(s) 118, different tenants may be associated with different metadata of web service 116. The metadata for all the tenants maybe centrally stored. For example, as shown in FIG. 1, metadata 124 (which represents the metadata utilized by a single tenant) may be stored in a database or cache maintained by storage node 114A. Once a tenant modifies its data model of data model(s) 118 or a definition

```
<EntityType Name="User">
  <Key>
    <PropertyRef Name="userId" />
  </Key>
  <Property Name="userId" Type="String" required="true" creatable="true"
updatable="true" visible="true" sortable="true" filterable="true" maxLength="255"/>
  <Property Name="username " Type="String" required="true" creatable="true"
updatable="true" visible="true" sortable=" true" filterable="true" maxLength="255" />
  <Property Name="firstName" Type="String" required="true" creatable="true"
updatable="true" visible="true" sortable=" true " filterable=" true" maxLength="255" />
  <Property Name="lastName" Type="String" required="true" creatable="true"
updatable="true" visible="true" sortable=" true " filterable="true" maxLength="255" />
  ......
</EntityType>
<EntityType Name="Photo">
  <Key>
    <PropertyRef Name="photoId" />
  </Key>
  <Property Name="photoId" Type="long" required="true" creatable="true"
updatable="true" visible="true" sortable="true" filterable="true" />
  <Property Name="userid" Type="String" required="true" creatable="true"
updatable="true" visible="true" sortable="true" filterable="true" maxLength="255"/>
  <Property Name="photoType" Type="integer" required="true" creatable="true"
updatable="true" visible="true" sortable=" true" filterable="true" />
  <NavigationProperty Name="userNav" required="false creatable="false"
updatable="false" upsertable="false" sortable="true" filterable="true" Relationship="
Photo_And_User" FromRole="photoEnd" ToRole="userEnd" />
  ......
</Entity Type>
......
<Association Name=" Photo_And_User ">
  <End Type="Photo" Multiplicity="1" Role=" photoEnd "></End>
  <End Type="User" Multiplicity="1" Role="userEnd"></End>
</Association>
......
```

As shown above, the metadata fragment shows the structure of two entity types (i.e., User and Photo), and the entity type Photo has one navigation (e.g., reference) to entity type User. As also shown above, each entity type may comprise a plurality of properties. For example, the entity type User may comprise a userid property, a username property, a firstName property, a lastName propertly, etc. The entity type Photo may comprise a photoId property, a userId property, a photoType property, etc.

A user or tenant may access and/or utilize web service 116 via computing device 106 (also referred herein as a client computing device). As shown in FIG. 1, computing device 106 includes a display screen 126 and a browser 128. A user may access and/or utilize web service 116 by interacting with an application at computing device 106 capable of accessing web service 116. For example, the user may use browser 128 to traverse a network address (e.g., a uniform resource locator) to web service 116, which invokes a user interface 130 (e.g., a web page) in a browser window rendered on computing device 106. By interacting with the user interface, the user may invoke web service 116, modify the user's data model of data model(s) 118 and/or a definition of an entity of entity(ies) 122. Computing device 106 of an entity of entity(ies) 122, the metadata corresponding thereto should be refreshed (i.e., updated) correspondingly to prevent an error (e.g., a business error where an invocation or data request is aborted prematurely). For example, suppose a tenant adds a new property to a particular entity of entity(ies) 122 and does not update the corresponding metadata. In such a case, both web service 116 and the client (e.g., computer device 106) may not perceive the change. As such, a business error may occur when attempting to invoke web service 116 and/or request data therefrom.

To avoid such issues, web service 116 may be configured to refresh metadata 124 upon detecting changes to data model(s) 118 and/or entity(ies) 122 thereof. For example, as shown in FIG. 1, web service 116 may comprise a monitor 131 and a metadata refresher 132. Monitor 131 may be configured to monitor data model(s) 118 and entities 122 thereof to detect changes made thereto. A change made to a field or property of data model(s) 118 that is shared by entities 122 of more than one entity group may be referred to as a global change. A change made to one or more entity(ies) 122 of an entity group 120 may be referred to as a local change. Monitor 131 may also be configured to periodically monitor a timestamp of metadata 124. If the age of the timestamp meets or exceeds a predetermined threshold (e.g., a lifetime or expiration date), monitor 131 may determine that metadata 134 is outdated or expired. The lifetime or expiration date of a particular version of metadata 124 may be preconfigured, for example, by a user or administrator. The lifetime or expiration date of metadata 124 may comprise a preconfigured period of time, such as, but not limited to, a configured number of minutes, hours, days, weeks, etc. Expiration of metadata 124 may require a change to a plurality of entity groups 120. Accordingly, such a change may also be referred to as a global change. In response to determining that a global change is required, monitor 131 may generate a trigger event of a first event type (e.g., a global event). Such a trigger event may specify whether data model 118 has been changed or whether metadata 124 is outdated or expired. In response to determining that a local change is required, monitor 131 may generate a trigger event of a second event type (e.g., a local event). Monitor 131 may provide trigger events to metadata refresher 132, for example, via a message or by calling an application programming interface (API) of metadata refresher 132.

Metadata refresher 132 may be configured to detect trigger events for updating metadata 124 from monitor 131. As described above, each of the trigger events may be associated with a particular event type. For example, a first event type, such as a global event, may be indicative of a change to data model(s) 118 or that a version of metadata 124 is outdated or expired. A second event type, such as a local event, may be indicative of a change to one or more entity(ies) 122 of an entity group 120.

In response to detecting a global trigger event of the first event type, metadata refresher 132 may update metadata 124 based on all entity(ies) 122. For example, when metadata refresher 132 detects that a tenant updates its data model of data model(s) 118 or that the metadata of metadata 124 associated with the tenant expires, metadata refresher 132 updates the metadata corresponding to entity(ies) 122 of all entity group(s) 120 of the tenant's data model of data model(s) 120. In response to detecting a local trigger event of the second event type, metadata refresher 132 may update metadata 124 based on a subset of entities (122) or entity group(s) 120. For example, a tenant may just change the definition of one or more entities belonging to one entity group of entity group(s) 120. A definitional change to an entity includes adding a new property, removing an existing property or updating an existing property. Such a definitional change will not impact other entity groups. But, as the entities of the same group have a close relationship, if one entity is changed, then other entities in the same group may also be refreshed. Accordingly, metadata refresher 132 may update just a portion of metadata 124 corresponding to the updated entities of the one entity group. The other entity group(s) of entity group(s) 120 that are not modified are not refreshed. The partial refresh of metadata 124 advantageously conserves computer resources (e.g., processing cycles, memory, I/O operations), as only a portion of metadata 124 is updated. If certain entity(ies) of entity(ies) 122 fail to resolve (for metadata updates for either event type), metadata refresher 132 may schedule a job to retry entity resolution for the failed entities.

Figure 2:
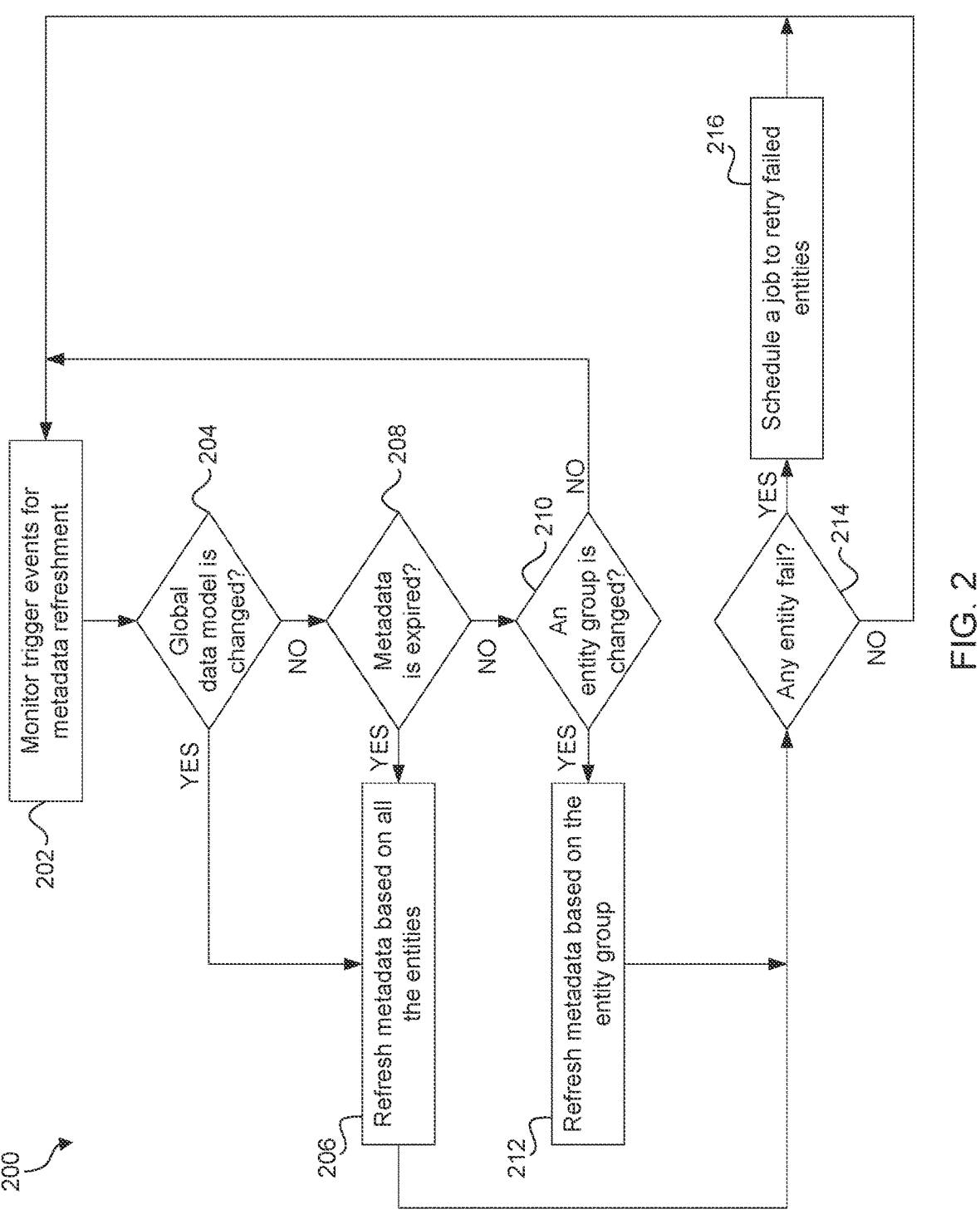
FIG. 2 is a flowchart illustrating a process for refreshing metadata of a web service, according to some embodiments.

FIG. 2 is a flowchart for a method 200 for refreshing metadata of a web service, according to some embodiments. Method 200 can be performed by processing logic that can comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, metadata refresher 132 monitors for trigger events for metadata refreshment. The trigger events may be received from monitor 131. For example, monitor 131 may be configured to monitor data model(s) 118 and entity(ies) 122 of entity group(s) 120 for changes thereto. Monitor 131 may also monitor the expiration date of metadata 124. Changes to data model(s) 118 and a determination that metadata 124 has expired may correspond to the first event type (e.g., global type), and definitional changes to entity(ies) 122 of entity group(s) 120 may correspond to the second event type (e.g., local), as respectively described above.

In 204, metadata refresher 132 determines whether a global data model of data model(s) 118 has changed, for example, based on whether metadata refresher 132 receives a trigger event of a first event type or a second event type from monitor 131. If metadata refresher 132 determines that a global data model of data model(s) 118 has changed (e.g., based on receiving a trigger event of the first event type, then flow continues to 206. Otherwise, flow continues to 208.

In 206, metadata refresher 132 may update metadata 124 based on all entity(ies) 122 in all entity groups 120. In one example, a tenant may update a field or property that is shared by entity(ies) 122 of more than one entity group 120 (e.g., a locale field, which may indicate a particular geographical region (e.g., en-US, fr-FR, etc.)). A change to such a field or property affects many entities of entity(ies) 122 of more than one entity group 120, and therefore, the metadata for such all entities in the corresponding data model are updated. Monitor 131 may monitor and detect such a change and provide a trigger event of the first event type to metadata refresher 132. The trigger event may specify the changes made to data model 118. Metadata refresher 132 may determine the metadata to be updated based on such changes. Before updating the metadata, an entity resolution operation may be performed, where the full definition of a particular entity is determined. To determine the full definition, metadata refresher 132 may determine whether a particular entity references other entity(ies). From the metadata fragment provided earlier, the entities "User" and "Photo" reference each other. Metadata refresher 132 may examine and resolve the references to these other entity(ies) to generate a resolved entity definition for the particular entity in which all the references are replaced by in-lined attribute definitions that use primitive data formats and trait references. For example, one or more properties of a first entity may be copied to a second entity that references the first entity. The metadata is refreshed upon successful entity resolution.

In 208, metadata refresher 132 determines whether metadata 124 has expired, for example, based on receiving a trigger event of the first event type. For example, monitor 131 may compare the timestamp of metadata 124 to the configured expiration date assigned thereto. If the timestamp exceeds the configured expiration date, monitor 131 determines that metadata 124 has expired and provides a trigger event of the first event type to metadata refresher 132. Metadata refresher 132 determines that metadata 124 has expired based on receiving such a trigger event, and flow continues to 206, where metadata refresher 132 updates all of the metadata 124 corresponding to the data model 118. Otherwise, flow continues to 210.

In 210, metadata refresher 132 determines that only one entity group of entity group(s) 120 has changed, for example, based on receiving a trigger event of the second event type. For example, monitor 131 may determine that a tenant changes the definition of one or more entities belonging to one entity group of entity group(s) 120. If monitor 131 determines that an entity group of entity group(s) 120 has changed, monitor 131 provides a trigger event of the second event type to metadata refresher 132. Metadata refresher 132 determines that only one entity group of entity group(s) 120 has changed based on such a trigger event, and flow continues to 212. Otherwise, flow returns to 202.

In 212, metadata refresher 132 may update just a portion of metadata 124 corresponding to the updated entities of the one entity group (e.g., as specified via the trigger event received from monitor 131). In one example, this can include having the metadata associated with one or more entities (122) in one entity group (120) where the definition of the one or more entities (122) has been changed. As described above with reference to 206, an entity resolution operation may be performed before updating the metadata. The metadata may be updated upon successful entity resolution.

In 214, metadata refresher 132 may determine whether any entities for which metadata 124 was to be updated failed to be updated. For example, an update to metadata 124 may fail if the entity resolution for the updated entities fails. During entity resolution, metadata refresher 132 may attempt to build objects for such entities according to the updated data model 118 and/or updated definition of entities 122 thereof. If there is no exception during building, metadata refresher 132 may determine that the update was successful. If any exception was thrown during building, metadata refresher 132 may determine that the update failed. An exception may be thrown for various reasons, including, but not limited to, a property not being found, a property being mismatched to data model 118, a hardware or network problem causing access to metadata 124 to fail, etc. If the update to metadata 124 is successful, flow returns to 202. Otherwise, flow continues to 216.

In 216, metadata refresher 132 may retry the entity resolution for the entities. For example, metadata refresher 132 may schedule execution of another entity resolution operation in an attempt to resolve the entities at a later time. Metadata refresher 132 may schedule the subsequent resolution operation as a background job or task to minimize the load on web service 116. Flow then continues to 202, where metadata refresher 132 monitors for additional trigger events.

Figure 3:
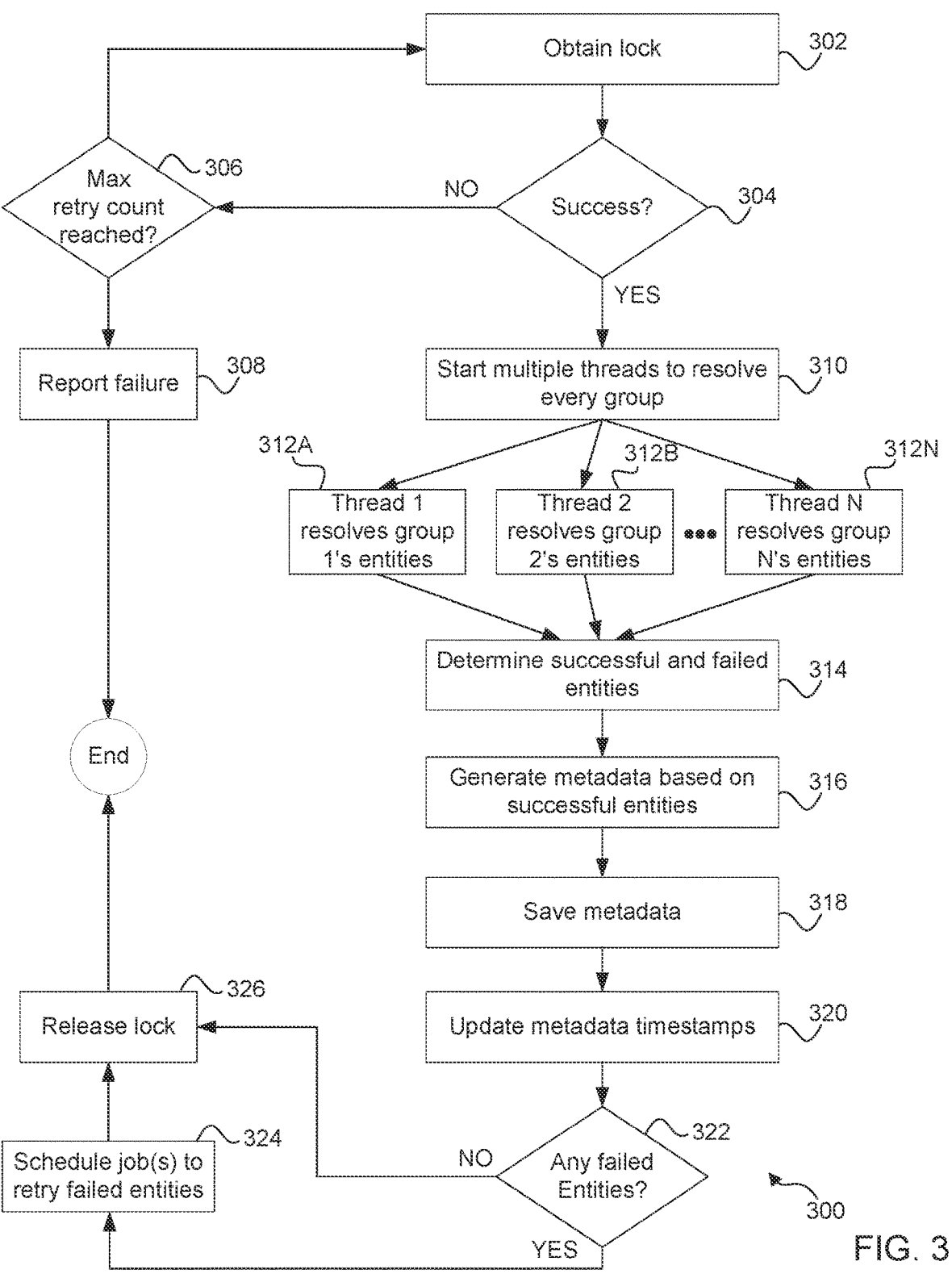
FIG. 3 is a flowchart illustrating a process for refreshing metadata of a web service based on a global trigger event of a first event type, according to some embodiments.

FIG. 3 is a flowchart for a method 300 for refreshing metadata of a web service based on a global trigger event of a first event type, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. In addition, method 300 may be representative of 206, 214 and 216 of FIG. 2. However, method 300 is not limited to these example embodiments.

In 302, upon detecting a global trigger event of the first event type, metadata refresher 132 may attempt to obtain a lock associated with metadata 124 to be updated. For example, metadata refresher 132 may provide a request to locking component 134. Locking component 134 may be configured to obtain a lock on metadata 124 on a per-tenant basis. That is, locking component 134 may lock metadata 124 associated with a particular tenant (e.g., for the tenant that modified a data model of data model(s) 118). Locking metadata 124 limits the number of refreshments to metadata concurrently and avoids computer resource abuse. Accordingly, at any given point for a particular tenant, a single request to refresh metadata 124 may be executed.

In 304, metadata refresher 132 may determine whether the lock was obtained successfully. For example, in some cases, the lock may fail, for example, due to network errors. In such a case, locking component 134 may provide a response to metadata refresher 132 indicating that the lock was not obtained, and flow continues to 306. Otherwise, if locking component 134 provides a response to metadata refresher 132 indicating that the lock was obtained, flow continues to 310.

In 306, metadata refresher 132 determines whether a maximum lock retry count for obtaining the lock has been reached. The maximum lock retry count may be configurable, for example, by a user or administrator. If metadata refresher 132 determines that the maximum lock retry count has been reached, then flow continues to 308. Otherwise, flow returns to 302 where another request to obtain the lock is provided to locking component 134.

In 308, metadata refresher 132 may provide an error report or message indicating that a lock was not successfully obtained, and the metadata refreshment operation terminates. The error message may be provided to the tenant that attempted to update its data model of data model(s) 118, for example, via user interface 130.

In 310, metadata refresher 132 may initiate multiple computing threads to resolve entity(ies) 122 of entity group(s) 120 of the tenant's data model of data model(s) 118. For example, as shown in FIG. 3, metadata refresher 132 may initiate, at 312A, a first computing thread that performs an entity resolution operation to resolve the entities of a first entity group of entity group(s) 120 (e.g., where the full definition of the entities of the first entity group is determined), may initiate, at 312B, a second computing thread that performs an entity resolution operation to resolve the entities of a second entity group of entity group(s) 120 (e.g., where the full definition of the entities of the second entity group is determined), and may initiate, at 312N, an Nth computing thread that performs an entity resolution operation to resolve the entities of an Nth entity group of entity group(s) 120 (e.g., where the full definition of the entities of the Nth entity group is determined), where N is any positive integer. Accordingly, metadata refresher 132 may initiate a respective computing thread for each entity group of entity group(s) 120 such that all entity groups (120), and thereby comprising all entities (122) of the data model are attempted to be updated. Each of the computing threads may return an indication of first entities of a respective entity group that were successfully resolved and an indication of second entities of the respective entity group that were not successfully resolved.

In 314, metadata refresher 132 may analyze the indications received from the various threads 312A through 312N and determines which entities of the different entity groups resolved successfully and which entities of the different entity groups failed (i.e., entities that did not resolve successfully).

In 316, metadata refresher 132 may generate metadata based on the entity(ies) 122 that resolved successfully and/or the existing metadata (i.e., metadata 124 before its updated). For example, if a user updates a property shared among a plurality of entities (122) in an entity group (120), each entity (122) in entity group (120) has that corresponding property modification written into the corresponding metadata. As described above, the changes made to data model 118 and/or the entities 122 thereof may be specified via the trigger event provided to metadata refresher 132 by monitor 131.

In 318, metadata refresher 132 may save the generated metadata to the database and/or cache in which metadata 124 is maintained. For example, metadata refresher 132 may update (e.g., overwrite) a portion of metadata 124 corresponding to the entities that resolved successfully in the database and/or cache.

In 320, metadata refresher 132 may update the time-stamps associated with the updated portion of metadata 124. The timestamps may indicate a time at which the updated portion of metadata 124 was generated and/or saved in the database and/or cache.

In 322, metadata refresher 132 may determine whether any entities did not resolve successfully based on the indications provided by the computing threads of 312A-312N. If metadata refresher 132 determines that certain entities did not resolve successfully, it follows that the metadata associated with those entities (122) was not updated, so the flow continues to 324. Otherwise, flow continues to 326.

At 324, metadata refresher 132 may schedule a job to retry metadata updates for the failed entities (e.g., by attempting to resolve the failed entities and subsequently updating the metadata upon successful entity resolution), as described above with reference to 216.

At 326, metadata refresher 132 may provide a request to locking component 134 to release the lock. In response to receiving the request, locking component 134 may release the lock on metadata 124 associated with the tenant for which metadata 124 was updated, and the metadata refreshment operation terminates.

FIG. 4 is a flowchart for a method 400 for refreshing metadata of a web service based on a local trigger event of a second event type, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 1. In addition, method 400 may be representative of 210, 212, 214 and 216 of FIG. 2. However, method 400 is not limited to those example embodiments.

In 402, upon detecting a local trigger event of the second event type, metadata refresher 132 may attempt to resolve entity(ies) 122 of the entity group of entity group(s) 120 modified by the tenant. It should be noted that since each change within each entity group (120) is independent of other possible changes to other entity groups, the process for updating the metadata will not comprise updating, or attempting to update, all of the entity groups (120) within a data model. FIG. 4 is representative for updating one entity group (120), but FIG. 4 would therefore be repeated for other, independent changes to other entity groups (120). For example, as shown in FIG. 1, metadata refresher 132 may initiate a computing thread that performs an entity resolution operation to resolve entity(ies) 122 of the entity group. The computing thread may return an indication of first entities of entity(ies) 122 of the entity group that were successfully resolved and an indication of second entities of entity(ies) 122 of the entity group that were not successfully resolved.

In 404, metadata refresher 132 may analyze the indications to determine which entities of entity(ies) 122 of the entity group resolved successfully and which entities of entity(ies) 122 of the entity group failed (i.e., entities that did not resolve successfully). If any of entity(ies) 122 resolved successfully, flow continues to 406. Otherwise, flow continues to 410.

In 406, metadata refresher 132 may generate metadata based on entity(ies) 122 that resolved successfully and/or the existing metadata (i.e., metadata 124 before its updated). For example, if a user adds or renames an entity to a particular entity group of entity group(s) 120, metadata refresher 132 may generate a property name corresponding to the name of the new or renamed entity. As described above, the changes made to data model 118 and/or the entities 122 thereof may be specified via the trigger event provided to metadata refresher 132 by monitor 131.

In 408, metadata refresher 132 may save the generated metadata to the database and/or cache in which metadata 124 is maintained. For example, metadata refresher 132 may update (e.g., overwrite) a portion of metadata 124 corresponding to the entities that resolved successfully in the database and/or cache. Metadata refresher 132 may update the timestamps associated with the updated portion of metadata 124. The timestamps may indicate a time at which the updated portion of metadata 124 was generated and/or saved in the database and/or cache.

In 410, metadata refresher 132 may determine whether any of entity(ies) 122 did not resolve successfully based on the indications provided by the computing thread initiated in 402. If metadata refresher 132 determines that certain entities did not resolve successfully, it follows that the metadata associated with those entities (122) was not updated, so the flow continues to 412. Otherwise, the metadata refreshment operation ends. As described above, during entity resolution, metadata refresher 132 may attempt to build objects for such entities according to the updated data model 118 and/or updated definition of entities 122 thereof. If there is no exception during building, metadata refresher 132 may determine that the update was successful. If any exception was thrown during building, metadata refresher 132 may determine that the update failed. An exception may be thrown for various reasons, including, but not limited to, a property not being found, a property being mismatched to data model 118, a hardware or network problem causing access to metadata 124 to fail, etc.

At 412, metadata refresher 132 may schedule a job to retry metadata updates for the failed entities, as described above with reference to 216 of FIG. 2, and the metadata refreshment operation ends.

Figure 5:
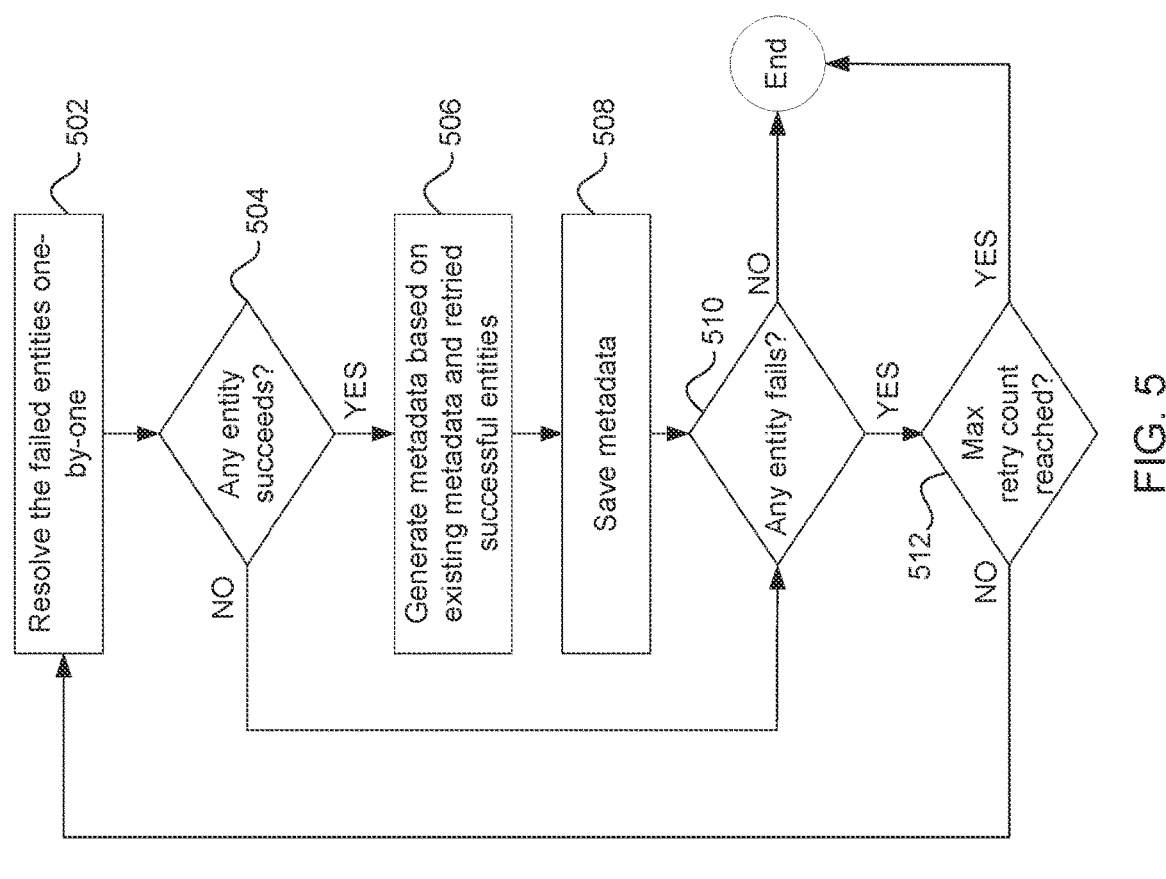
FIG. 5 is a flowchart illustrating a process for scheduling a job to retry failed entity resolution operations, according to some embodiments.

FIG. 5 is a flowchart for a method 500 for scheduling a job to retry failed entity resolution operations, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 may correspond to the steps performed at 324 and/or 412.

Method 500 shall be described with reference to FIG. 1. In addition, method 500 may be representative of 324 of FIG. 3 and 412 of FIG. 4. However, method 500 is not limited to those example embodiments.

In 502, metadata refresher 132 may attempt to resolve each of entity(ies) 122 that failed to resolve at 322 and/or 410 (e.g., entities that failed to resolve for one or more entity groups of entity group(s) 120). Metadata refresher 132 may attempt to resolve each of entity(ies) 122 one at a time. For example, as shown in FIG. 1, metadata refresher 132 may initiate one or more computing threads that perform an entity resolution operation to resolve the previously-failed entities. The computing thread(s) may return an indication of first entities of the previously-failed entities that were successfully resolved and an indication of second entities of the previously-failed entities that were not successfully resolved.

In 506, metadata refresher 132 may generate metadata based on the entities that resolved successfully at 504 and/or the existing metadata (i.e., metadata 124 before its updated). For example, if a user adds or renames an entity to a particular entity group of entity group(s) 120, metadata refresher 132 may generate a property name corresponding to the name of the new or renamed entity.

In 508, metadata refresher 132 may save the generated metadata to the database and/or cache in which metadata 124 is maintained. For example, metadata refresher 132 may update (e.g., overwrite) a portion of metadata 124 corresponding to the entities that resolved successfully in the database and/or cache. Metadata refresher 132 may update the timestamps associated with the updated portion of metadata 124. The timestamps may indicate a time at which the updated portion of metadata 124 was generated and/or saved in the database and/or cache.

In 510, metadata refresher 132 may determine whether any of the previously-failed entities did not resolve successfully based on the indications provided by the computing thread(s) initiated in 502. If metadata refresher 132 determines that certain entities did not resolve successfully, flow continues to 512. Otherwise, the metadata refreshment operation ends.

At 512, metadata refresher 132 determines whether a maximum retry count for resolving one or more previously-failed entities has been reached. The maximum retry count may be configurable, for example, by a user or administrator. If metadata refresher 132 determines that the maximum retry count has been reached, then the entity resolution operation and metadata refreshment operation terminates and metadata 124 for the failed entity(ies) is not updated. Otherwise, flow returns to 502 where the previously-failed entity(ies) are attempted to be resolved again.

FIG. 6 is a flowchart for a method 600 for updating metadata associated with a data model, wherein the data model comprises a plurality of entities arranged into a plurality of entity groups, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to that example embodiment.

In 602, metadata refresher 132 of web service 116 may determine that data model 118 has been changed based on one of a first trigger event or a second trigger event. For example, as described herein, the first trigger event is indicative of at least one of a global change to data model 118 or an expiration of metadata 124, and the second trigger event is indicative of a change to at least one entity group of the plurality of entity groups. The trigger event may be received from monitor 131.

In 604, in response to determining that data model 118 has been changed based on the first trigger event, metadata refresher 132 may resolve the plurality of entities 122 in the plurality of entity groups 120. For example, as described herein, metadata refresher 132 may resolve the plurality of entities 122 by copying properties from a first entity of the plurality of entities 122 into a copy of a second entity of the plurality of entities 122, where the second entity references the first entity.

In 606, in response to determining that data model 118 has been changed based on the first trigger event, metadata refresher 132 may, for the plurality of entities 122 that resolved successfully, generate updated metadata 124 commensurate with the change and save the updated metadata 124.

FIG. 7 is a flowchart for a method 700 for resolving entities based on obtaining a lock on the metadata, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 1. However, method 700 is not limited to that example embodiment.

In 702, in response to determining that data model 118 has been changed based on the first trigger event, metadata refresher 132 may obtain a lock associated with metadata 124. For example, as described herein, metadata refresher 132 may provide a request to locking component 134. Locking component 134 may be configured to obtain a lock on metadata 124 on a per-tenant basis. That is, locking component 134 may lock metadata 124 associated with a particular tenant (e.g., for the tenant that modified a data model of data model(s) 118).

In 704, metadata refresher 132 may resolve the plurality of entities 122 in the plurality of entity groups 120 after obtaining the lock. For example, as described herein, metadata refresher 132 may, for each entity group of the plurality of entity groups 120, metadata refresher 132 may initiate a respective first computing thread that resolves a respective plurality of entities 122 of the entity group 120.

In some aspects, for each entity group of the plurality of entity groups 120, metadata refresher 132 may, for entities of the respective plurality of entities 122 of the entity group 120 that did not resolve successfully, schedule execution of at least one second thread configured to resolve the entities of the respective plurality of entities 122 of the entity group 120 that did not resolve successfully.

FIG. 8 is a flowchart for a method 800 for retrying entity resolution for an entity that resolved unsuccessfully, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 1. However, method 800 is not limited to that example embodiment.

In 802, metadata refresher 132 may determine that a maximum retry count has not exceeded a predetermined threshold.

In 804, metadata refresher 132 may, responsive to determining that the maximum retry count has not exceeded the predetermined threshold, resolve the entities of the respective plurality of entities 122 of the entity group 120 that did not resolve successfully via the at least one second thread.

Figure 9:
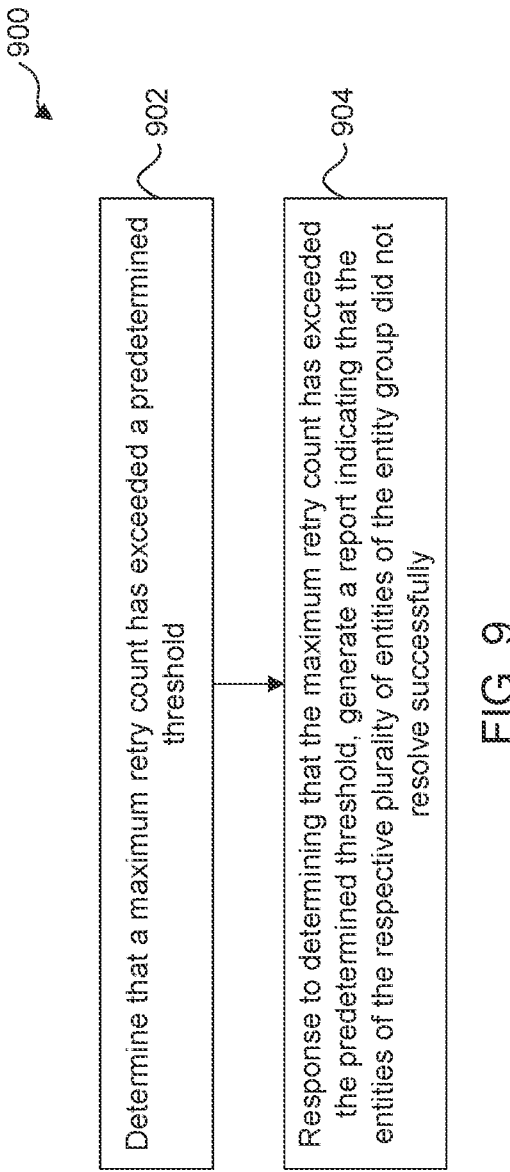
FIG. 9 is a flowchart illustrating a process for reporting an error based an unsuccessful entity resolution for an entity, according to some embodiments.

FIG. 9 is a flowchart for a method 900 for reporting an error based an unsuccessful entity resolution for an entity, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 1. However, method 900 is not limited to that example embodiment.

In 902, metadata refresher 132 may determine that a maximum retry count has exceeded a predetermined threshold.

In 904, metadata refresher 132 may, responsive to determining that the maximum retry count has exceeded the predetermined threshold, generate a report indicating that the entities of the respective plurality of entities 122 of the entity group 120 did not resolve successfully.

FIG. 10 is a flowchart for a method 1000 for updating metadata associated with a data model, wherein the data model comprises a plurality of entities arranged into a plurality of entity groups, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 1. However, method 1000 is not limited to that example embodiment.

In 1002, metadata refresher 132 of web service 116 may determine that data model 118 has been changed based on one of a first trigger event or a second trigger event. For example, as described herein, the first trigger event is indicative of at least one of a global change to data model 118 or an expiration of metadata 124, and the second trigger event is indicative of a change to at least one entity group of the plurality of entity groups In 1004, in response to determining that data model 118 has been changed based on the second trigger event, metadata refresher 132 may determine a first entity group of the plurality of entity groups 120 that is associated with the change.

In 1006, in response to determining that data model 118 has been changed based on the second trigger event, metadata refresher 132 may resolve all entities 122 in the first entity group of entity groups 120. For example, as described herein, metadata refresher 132 may resolve all the entities 122 by copying properties from a first entity of the entities 122 into a copy of a second entity of the entities 122, where the second entity references the first entity.

In 1008, in response to determining that data model 118 has been changed based on the second trigger event, metadata refresher 132 may, for the entities 122 in the first entity group of entity groups 120 that resolved successfully, generate updated metadata 124 commensurate with the change and save the updated metadata 124.

In some aspects, for each entity of the entities 122 in the first entity group of entity groups 120 that did not resolve successfully, metadata refresher 132 may schedule execution of a thread configured to resolve the entity.

FIG. 11 is a flowchart for a method 1100 for retrying entity resolution for an entity that resolved unsuccessfully, according to some embodiments. Method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art.

Method 1100 shall be described with reference to FIG. 1. However, method 1100 is not limited to that example embodiment.

In 1102, metadata refresher 132 may determine that a maximum retry count has not exceeded a predetermined threshold.

In 1104, metadata refresher 132 may, responsive to determining that the maximum retry count has not exceeded the predetermined threshold, resolve the entity 122 via the thread.

FIG. 12 is a flowchart for a method 1200 for reporting an error based an unsuccessful entity resolution for an entity, according to some embodiments. Method 1200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art.

Method 1200 shall be described with reference to FIG. 1. However, method 1200 is not limited to that example embodiment.

In 1202, metadata refresher 132 may determine that a maximum retry count has exceeded a predetermined threshold.

In 1204, metadata refresher 132 may, responsive to determining that the maximum retry count has exceeded the predetermined threshold, generate a report indicating that the entities 122 in the first entity group of entity groups 120 did not resolve successfully.

Figure 13:
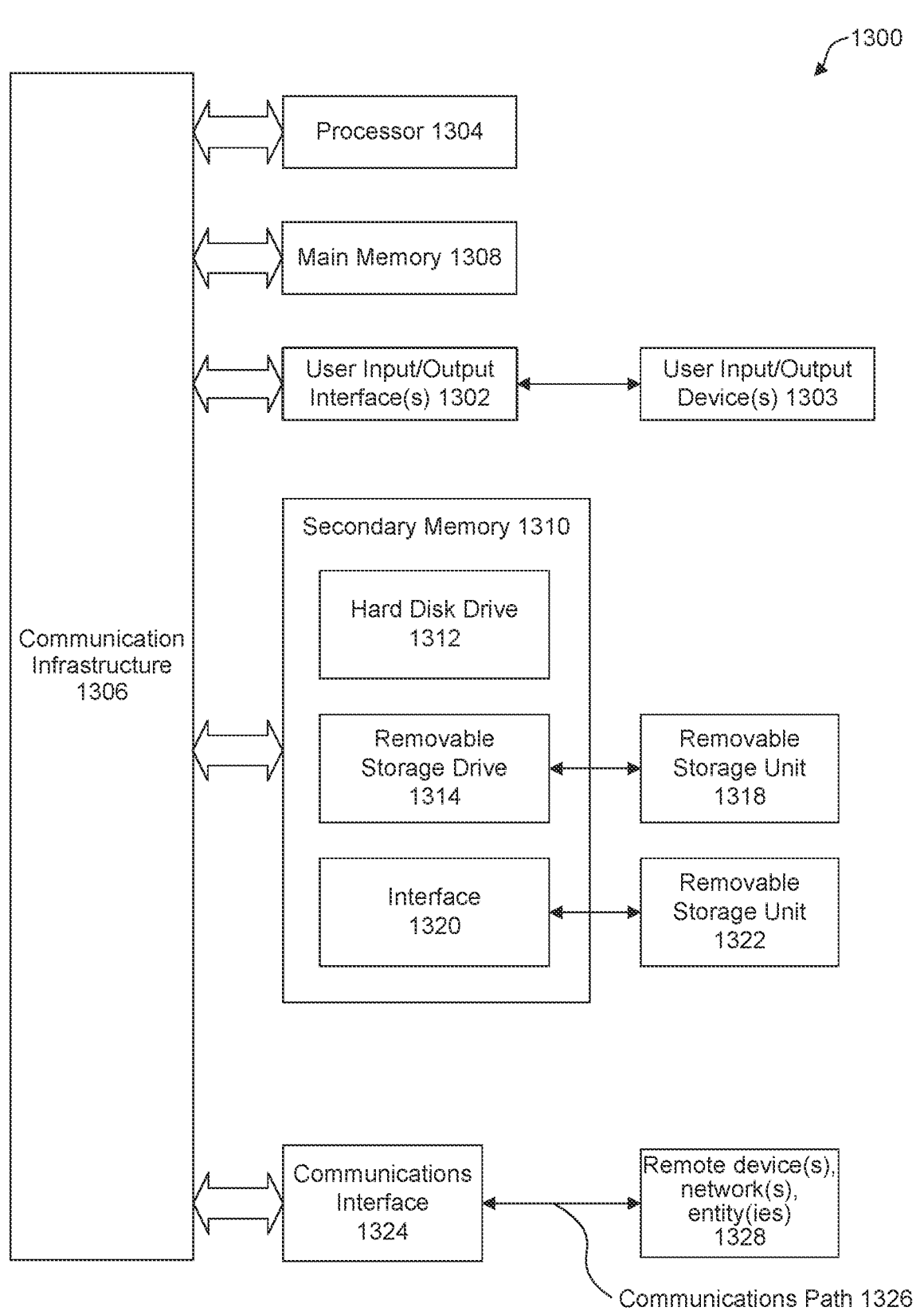
FIG. 13 is an example computer system useful for implementing various embodiments.

Various embodiments may be implemented, for example, using one or more well-known computer systems, such as computer system 1300 shown in FIG. 13. One or more computer systems 1300 may be used, for example, to implement any of the embodiments discussed herein, as well as combinations and sub-combinations thereof.

Computer system 1300 may include one or more processors (also called central processing units, or CPUs), such as a processor 1304. Processor 1304 may be connected to a communication infrastructure or bus 1306.

Computer system 1300 may also include user input/output device(s) 1303, such as monitors, keyboards, pointing devices, etc., which may communicate with communication infrastructure 1306 through user input/output interface(s) 1302.

One or more of processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 may also include a main or primary memory 1308, such as random access memory (RAM). Main memory 1308 may include one or more levels of cache. Main memory 1308 may have stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system 1300 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for updating metadata associated with a data model of a web service, wherein the data model comprises a plurality of entities arranged into a plurality of entity groups such that a first entity group comprises a first entity and a second entity, the computer-implemented method comprising:

monitoring a first memory, in which the data model of the web service is stored, for one or more changes made to the first entity in the first entity group of the data model;

generating, based on said monitoring, a trigger event indicative of the one or more changes;

determining that the first entity in the first entity group of the data model of the web service has been changed based on generating the trigger event;

in response to determining that the first entity in the first entity group of the data model of the web service has been changed based on generating the trigger event:

resolving the second entity in the first entity group, wherein resolving the second entity in the first entity group comprises:

determining the second entity references the first entity; and attempting to build an object corresponding to at least the second entity based on properties of at least the second entity; and based on a determination that the object was successfully built:

generating updated metadata commensurate with the change by copying properties from the first entity into a copy of the second entity; and overwriting at least a portion of metadata, which corresponds to the second entity, stored in a second memory that is different from the first memory with the updated metadata;

receiving a data request; and responding to the data request using the updated metadata.

2. The computer-implemented method of claim 1, further comprising:

in response to determining that the first entity in the first entity group of the data model has been changed based on generating the trigger event, obtaining a lock associated with the metadata, wherein resolving the second entity in the first entity group further comprises:

resolving the second entity after obtaining the lock.

3. The computer-implemented method of claim 2, wherein resolving the second entity after obtaining the lock comprises:

initiating a first computing thread that resolves the second entity.

4. The computer-implemented method of claim 3, further comprising:

based on a determination that the second entity did not resolve successfully, scheduling execution of a second thread configured to resolve the second entity that did not resolve successfully.

5. The computer-implemented method of claim 4, wherein scheduling execution of the second thread comprises:

determining that a maximum retry count has not exceeded a predetermined threshold; and responsive to determining that the maximum retry count has not exceeded the predetermined threshold, resolving the second entity that did not resolve successfully via the second thread.

6. The computer-implemented method of claim 4, wherein scheduling execution of the second thread comprises:

determining that a maximum retry count has exceeded a predetermined threshold; and responsive to determining that the maximum retry count has exceeded the predetermined threshold, generating a report indicating that the second entity did not resolve successfully.

7. The computer-implemented method of claim 1, wherein the trigger event is indicative of at least one of a global change to the data model or an expiration of the metadata.

8. The computer-implemented method of claim 1, wherein generating the updated metadata commensurate with the change by copying properties from the first entity into the copy of the second entity comprises replacing all references to the first entity within the second entity with in-lined attribute definitions that use primitive data formats and trait references of the first entity.

9. A system for updating metadata associated with a data model of a web service, wherein the data model comprises a plurality of entities arranged into a plurality of entity groups such that a first entity group comprises a first entity and a second entity, the system comprising:

a first memory;

a second memory that is different from the first memory; and at least one processor coupled to the first memory and the second memory and configured to:

monitor the first memory, in which the data model of the web service is stored, for one or more changes made to the first entity in the first entity group of the data model;

generate a trigger event indicative of the one or more changes;

determine that the first entity in the first entity group of the data model of the web service has been changed based on a generation of the trigger event;

in response to a determination that the first entity in the first entity group of the data model of the web service has been changed based on the generation of the trigger event:

resolve the second entity in the first entity group, wherein, to resolve the second entity, the at least one processor is configured to:

determine the second entity references the first entity; and attempt to build an object corresponding to at least the second entity based on properties of at least the second entity; and based on a determination that the object was successfully built:

generate updated metadata commensurate with the change, wherein, to generate the updated metadata, the at least one processor is configured to copy properties from the first entity into a copy of the second entity; and overwrite at least a portion of metadata, which corresponds to the second entity, stored in the second memory with the updated metadata;

receive a data request; and respond to the data request using the updated metadata.

10. The system of claim 9, where the at least one processor is further configured to:

based on a determination that the second entity in the first entity group did not resolve successfully, schedule execution of a thread configured to resolve the second entity.

11. The system of claim 10, wherein, to schedule execution of the thread, the at least one processor is configured to:

determine that a maximum retry count has not exceeded a predetermined threshold; and responsive to a determination that the maximum retry count has not exceeded the predetermined threshold, resolve the second entity via the thread.

12. The system of claim 10, wherein, to schedule execution of the thread, the at least one processor is configured to:

determine that a maximum retry count has exceeded a predetermined threshold; and responsive to a determination that the maximum retry count has exceeded the predetermined threshold, generate a report indicating that the second entity did not resolve successfully.

13. The system of claim 9, wherein the trigger event is indicative of a change to the first entity group.

14. The system of claim 9, wherein, to copy properties from the first entity into the copy of the second entity, the at least one processor is further configured to:

replace all references to the first entity within the second entity with in-lined attribute definitions that use primitive data formats and trait references of the first entity.

15. A non-transitory computer-readable device having instructions stored thereon that, when executed by at least one computing device, causes the at least one computing device to perform operations for updating metadata associated with a data model of a web service, wherein the data model comprises a plurality of entities arranged into a plurality of entity groups such that a first entity group comprises a first entity and a second entity, the operations comprising:

monitoring a first memory, in which the data model of the web service is stored, for one or more changes made to the first entity in the first entity group of the data model;

generating, based on said monitoring, a trigger event indicative of the one or more changes;

determining that the first entity in the first entity group of the data model of the web service has been changed based on generating the trigger event;

in response to determining that the first entity in the first entity group of the data model of the web service has been changed based on generating the trigger event:

resolving the second entity in the first entity group, wherein resolving the second entity in the first entity group comprises:

determining the second entity references the first entity; and attempting to build an object corresponding to at least the second entity based on properties of at least the second entity; and based on a determination that the object was successfully built:

generating updated metadata commensurate with the change by copying properties from the first entity into a copy of the second entity; and overwriting at least a portion of metadata, which corresponds to the second entity, stored in a second memory that is different from the first memory with the updated metadata;

receiving a data request; and responding to the data request using the updated metadata.

16. The non-transitory computer-readable device of claim 15, the operations further comprising:

in response to determining that the first entity in the first entity group of the data model has been changed based on generating the trigger event, obtaining a lock associated with the metadata, wherein resolving the second entity in the first entity group further comprises:

resolving the second entity after obtaining the lock.

17. The non-transitory computer-readable device of claim 16, wherein resolving the second entity after obtaining the lock comprises:

initiating a first computing threat that resolves the second entity.

18. The non-transitory computer-readable device of claim 17, further comprising:

based on a determination that the second entity did not resolve successfully, scheduling execution of a second thread configured to resolve the second entity that did not resolve successfully.

19. The non-transitory computer-readable device of claim 15, wherein the trigger event is indicative of at least one of a global change to the data model or an expiration of the metadata.

20. The non-transitory computer-readable device of claim 15, wherein generating the updated metadata commensurate with the change by copying properties from the first entity into the copy of the second entity comprises replacing all references to the first entity within the second entity with in-lined attribute definitions that use primitive data formats and trait references of the first entity.

\* \* \* \* \*